United States Patent Office 3,334,948
Patented Aug. 8, 1967

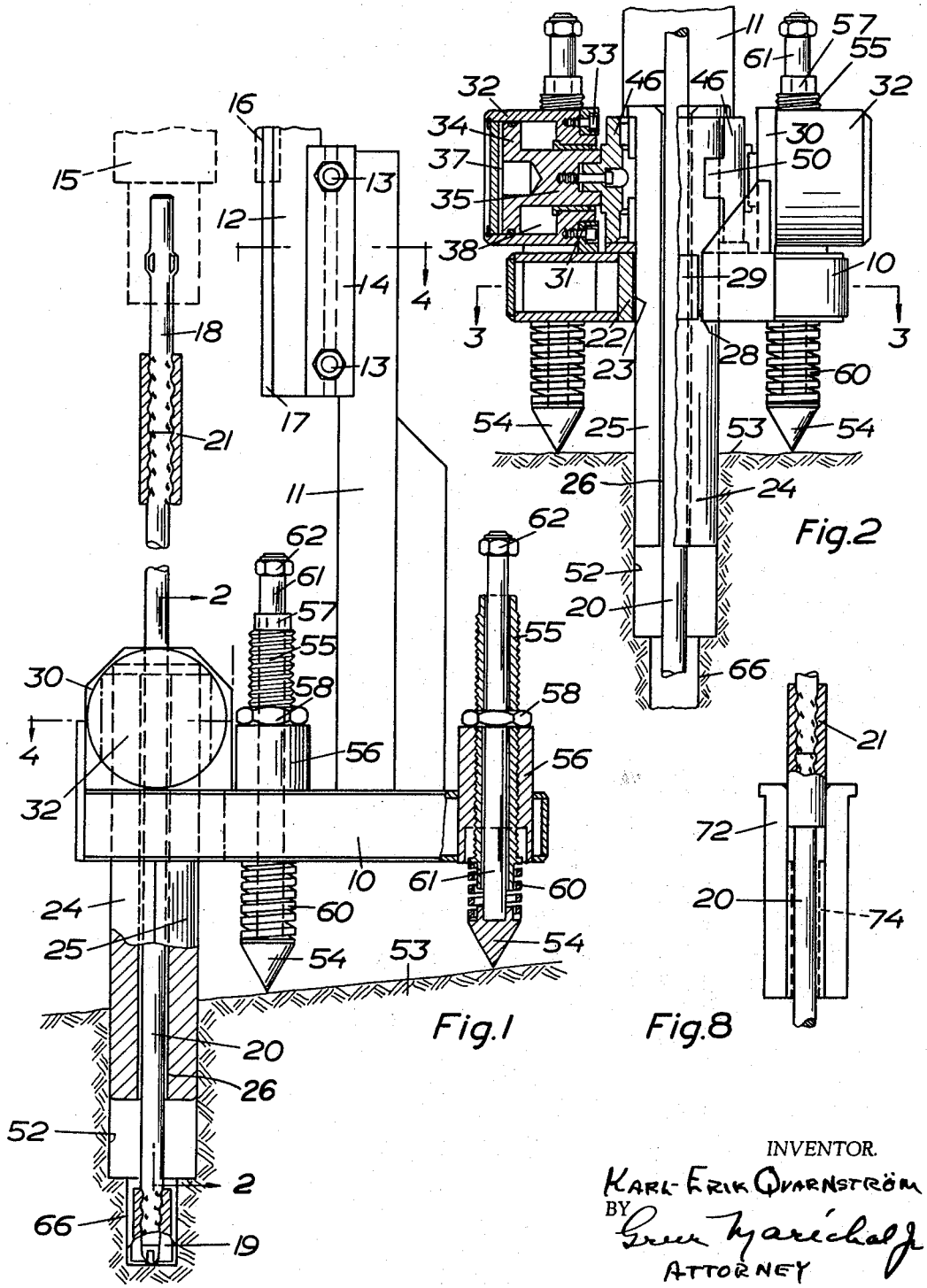

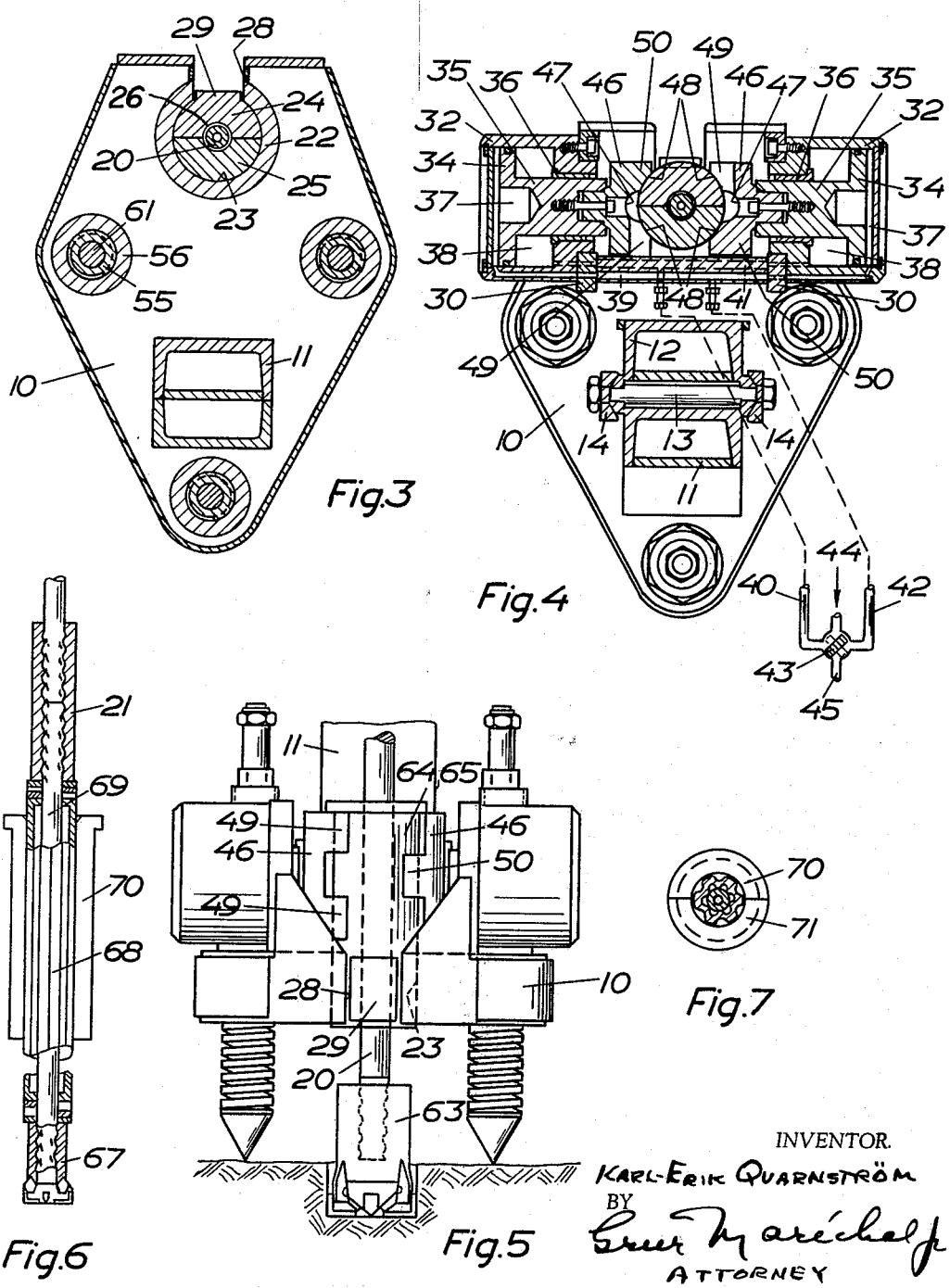

3,334,948
DRILL STEEL GUIDES
Karl-Erik Qvarnström, Vendelso, Sweden, assignor to Atlas Copco Aktiebolag, Nacka, Sweden, a corporation of Sweden
Filed Jan. 7, 1964, Ser. No. 336,216
8 Claims. (Cl. 308—3.9)

This invention relates to rock drills carrying a drill steel and mounted for movement along a feed shell and relates more specifically to a drill steel guide affixed to the feed shell for guiding the outer end of the drill steel when starting a hole and generally during the process of drilling.

Driving or raising of shafts and inclined drifts between levels underground has in some cases been performed by drilling and blasting groups of parallel long holes drilled from one level to the other. Such driving is economical and safe but demands a very high degree of drilling accuracy and due to the practical difficulties in drilling straight closely parallel long holes the shafts and drifts hitherto produced by that method usually have not exceeded a length of 30 meters. It is the main object of the present invention to provide a drill steel guide capable of improving the accuracy of long hole drilling and thereby capable of increasing the length of the drifts obtainable by long hole drilling and subsequent blasting. A further object of the invention is to provide a drill steel guide in which a detachable drill steel guiding sleeve is firmly supported at the front end of the drill shell and is capable of rigidly guiding the drill steel along a portion thereof of substantial axial length, thereby providing an accurate jig-like guidance for the drill steel in order to improve the accuracy and the three dimensional positioning of the drilled hole. A still further object of the invention is to provide a number of interchangeable guiding sleeves of the above character whereby all the different elements of the composite long hole drill steel always may be accurately guided in adjacency to the rock face during the process of drilling.

The above and other objects of the invention will become obvious from the following description and from the accompanying drawings, in which an embodiment of the invention is illustrated by way of example. It should be understood that this embodiment is only illustrative of the invention and that various modifications may be made within the scope of the claims without departing from the scope of the invention.

In the drawings FIG. 1 shows a partly sectional side view of a drill steel guide according to the invention. FIG. 2 is a partly sectional view substantially on line 2—2 in FIG. 1.

FIG. 3 is a sectional view on line 3—3 in FIG. 2. FIG. 4 is a sectional view on line 4—4 in FIG. 1. FIG. 5 is a top plan view corresponding to FIG. 2 but showing the drill steel guide equipped with an alternative guiding sleeve.

FIG. 6 is a longitudinal plan view of one half of another guide sleeve for guiding a portion of the drill steel carrying a guiding tube.

FIG. 7 is a top plan view of the sleeve arrangement in FIG. 6.

FIG. 8 shows in a manner similar to FIG. 6 still another guide sleeve intended for guiding the coupling sleeve of the extension drill steel.

Referring to the drawings the drill steel guide consists of a body 10 which preferably is welded out of pieces of sheet material and from the body 10 there extends a rearwardly pointing carrying bar 11. The bar 11 is affixed to the front end of the feed shell 12 by the aid of transverse bolts 13 and clamping bars 14. The shell 12 forms the usual elongated support for a rock drill 15 which is mounted on a slide 16 and may be reciprocated by power along suitable guides 17 on the feed shell 12 in a manner well-known in the art and therefore not shown in detail. Preferably the rock drill is of a type having means for reversing the drill rotation at will, whereby the drill rotating power may be used for coupling and uncoupling the units of the extension drill steel. The rock drill accommodates the impact transmitting neck adapter 18 of the drill steel which also includes a bit 19 and extension units each consisting of a drill rod 20 and a screwed-on coupling sleeve 21.

At one end of the body 10 there is provided a bushing 22 having a cylindrical bore 23 therein. An elongated split sleeve preferably consisting of two semi-cylindrical halves 24, 25 is snugly received in the bore 23 and protrudes therethrough and forwardly of the body 10. The bore 23 is strictly coaxial with the drill axis and a drill steel guiding bore 26 is provided centrally in the split sleeves 24, 25. The bore 26 is intended for receiving and guiding the drill rods of the drill steel along a portion thereof of substantial axial length. Along the bore 23 there is provided a slot 28 and one of the sleeve halves 24, 25 has a radially protruding lug 29 which engages the slot 28 and prevents rotation of the sleeve 24, 25 in the bore 23.

To the rear flat side of the body 10 there are fixed as by welding two parallel spaced-apart plates 30. The plates 30 are provided with coaxial bores 31 receiving the cylindrical end portions of two cylinder housings 32 connected to the plates 30 by bolts 33. The central axes of the bores 31 and the housings 32 are perpendicular to the drill steel axis and the cylinder housings 32 are disposed at the opposite remote sides of the plates 30 and are provided with pistons 34 reciprocally journalled therein. The pistons 34 have a tight sliding fit in cylinder bores provided in the housings 32 and are provided with piston rods 35 pointing in the direction of one another and tightly journalled in and protruding through linings 36 provided centrally in the opposite end portions of the housings 32. By the pistons 34 the cylinder bores are divided into a closing chamber 37 disposed adjacent the large piston face and an opening chamber 38 at the stem end of each piston 34.

The closing chambers 37 are supplied with pressure fluid via a passage 39 extending between the two closing chambers and connected via a nipple to a remote control conduit 42. The opening chambers 38 are in similar way interconnected by a passage 41 which via another nipple is coupled to a remote control conduit 40. At a suitable convenient location remote from the drill steel guide there are provided control means for admitting pressure fluid to act alternately in the respective two pairs of chambers 37, 38. The control means may for example consist of a four way valve 43 by means of which one pair, 37 or 38, of the chambers is connectable to a pressure fluid source indicated by the arrow 44 while the other simultaneously therewith is connected to the exhaust 45.

To the ends of the piston stems 35 there are bolted jaws 46 which may be used for the usual guiding of the drill rods 20 during conventional collaring and drilling of holes without regard to the accuracy of the long holes drilled. To this end the jaws 46 are provided with inner semi-cylindrical guiding surfaces 47 for encircling and guiding the drill rods 20 with the jaws 46 in position adjacent one another. The jaws 46 may also be used in conventional way for gripping the coupling sleeves 21 for coupling and uncoupling the units of the extension drill steel, and such gripping is performed by the outer portions of the semi-cylindrical surfaces 47 in a manner disclosed more in detail in United States patent to Ytterfors No. 3,231,318. Furthermore the jaws 46 are used for firmly gripping and supporting the upper portion of the sleeve 24, 25, to which end the jaws 46 are provided with outer partially cylindrical gripping surfaces 48. These gripping surfaces 48 are provided at the one side of each jaw 46 in a dual arrangement on axially spaced apart side lugs 49 and at the other side of the jaws 46 on a single central lug 50. In the adjacent position of the jaws 46 the central lugs 50 are received between the side lugs 49 on the opposite jaw, whereby the semi-cylindrical central guiding surfaces 47 in the central part of the jaws 46 can be brought together to form a cylindrical guiding surface or to grip a coupling sleeve 21.

The split sleeve 24, 25 has a substantial axial length active to support the drill steel and in the embodiment depicted in FIGS. 1-4 the sleeve 24, 25 protrudes forwardly beyond the body 10 to an extent enabling insertion of its forward end into a centering drill hole 52 which previously has been drilled into the rock face 53. By this additional engagement the sleeve 24, 25 will be able to provide a high degree of accuracy in the critical initial drilling phase.

The body 10 carries forwardly protruding rock engaging means consisting of three spurs providing a three point support for the body 10. The spurs 54 preferably include an outer spindle 55 which is threadedly received in a bushing 56 in the body 10. By screwing the hexagonal end 57 of the spindle 55 the spurs 54 may be adjusted longitudinally. The spindle 55 may be locked in adjusted position by a jam nut 58. Between the forward end of the spindle 55 and the spur 54 there is inserted a helical spring 60 and the spur proper has a rearwardly pointing stem 61 which is slidably carried in the spindle 55 and has a stop nut 62 engaging the hexagonal end 57 when the spur 54 is lifted from the ground. The springs 60 provide axial compressibility of the spurs 54 and by suitable longitudinal adjustment of the spindles 55 the spring forces of the three springs 60 may be set to substantially the same value even when the rock face is slanting or uneven. Hereby the body 10 and the carrying bar 11 can be uniformly loaded and relieved from undesirable excessive moments of flexure originating from the support.

The feed shell 12 is supported on suitable manipulating and positioning means of conventional type, which may be of the type disclosed in United States Patent to Ottosson, Hällberg, Qvarnström, 3,196,957 or may be of other type, and by such means the feed shell 12 and the appurtenant devices with the split sleeve 24, 25 detached from the body 10 will be positioned at the desired point on the rock face 53 with the spurs 54 in engagement therewith. Thereupon by adjustment of the spindles 55 the spurs will be adjusted axially in order to provide a uniform support for the body 10.

For drilling the initial short centering drill hole 52, there is used a large diameter drill bit 63, FIG. 5, carried by and screwed on a drill rod 20. The drill rod 20 is inserted into the bore 23 in the body 10 through the slot 28 and then screwed fast to the neck adapter 18 by means of a coupling sleeve 21, FIG. 1. For closely guiding the rod 20 during collaring and drilling of the centering hole 52, there is inserted axially into the bore 23 and around the rod 20 a split sleeve 64, 65 which is identical with the sleeve 24, 25 depicted in FIG. 1 in all respects except that it is considerably shorter and does not protrude beyond and forwardly of the body 10. Insertion of the sleeve 64, 65 is done with the two jaws 46 in open position, i.e., with the valve 43 in the dotted line position depicted in FIG. 4, in which pressure fluid is supplied to the opening chambers 38. With the sleeve snugly supported in the bore 23 and disposed between the jaws 46 and the lug 29 in the slot 28, the valve 43 is turned into the full line position of FIG. 4, whereby the opening chambers 38 are exhausted via the exhaust 45 and the closing chambers 37 are pressurized by pressure fluid from the source 44. The jaws 46 will now firmly grip the upper portion of the sleeve 64, 65 by means of the lugs 49, 50 and their gripping surfaces 48, which form an axial continuation of the centering bore 23. The sleeve 64, 65 will thus be rigidly supported in the body 10, providing a close and accurate guidance for the rod 20 and the bit 63 during drilling. With the centering hole 52 completed and the rod 20 and bit 63 retracted, the jaws are again opened whereupon the sleeve halves 64, 65, the rod 20 and the bit 63 may be removed.

As a continuation of the centering drill hole 52 a starting hole 66 is then drilled coaxially therewith, FIGS. 1, 2. To this end the drill bit 19 and a drill rod 20 are used and the long sleeve 24, 25 is inserted for guiding purposes in the bore 23 around the rod 20 and clamped between the jaws 46 with the sleeve 24, 25 supported and centered at its forward end in the centering hole 52. The starting hole 66 is drilled to about double the length of the centering hole 52, whereupon the split sleeve 24, 25 as well as the bit 19 together with the rod 20 are removed in the usual manner. Continued drilling of the hole 66 is then performed by means of a special per se conventional leading drill rod 69, FIGS. 6 and 7 having a longitudinally welled guide tube 68 therearound and keyed thereto, which tube extends the full length of the drill rod 69 from the bit 67 to the first coupling sleeve 21. During drilling with the welled tube rod 68, 69 there is placed a split sleeve 70, 71 in the bore 23 and between the jaws 46, which closely guides the tube rod 68, 69 until the coupling sleeve 21 has passed the sleeve 70, 71, at which instant a new change of sleeves is performed and a split sleeve having a central guiding bore of equal diameter with the coupling sleeves 21 and of which the one half is depicted by full lines in FIG. 8, is inserted in the bore 23 and clamped between the jaws 46. The drill string following upon the first welled guiding tube rod will consist of the usual rods 20 and coupling sleeves 21 and continued close guiding in adjacency to the rock face of these elements is performed by alternately using the sleeve 64, 65, FIG. 5 and the sleeve 72, FIG. 8. Intermediate portions of the drill string may in a manner well known in the art receive an additional centering in the hole by the provision of short guiding sleeves on some of the drill rods. In order to improve the guiding action at the instant when a coupling sleeve has reached the split sleeve 72 there may be provided a still further split sleeve having a stepped portion 74 therein as indicated by dotted lines in FIG. 8, whereby drill rod 20 and the coupling sleeve 21 may be guided simultaneously respectively by the stepped portion 74 and the wider guiding portion of the stepped sleeve.

What I claim is:

1. In a rock drill carrying a drill steel and mounted for movement along a feed shell, a drill steel guide comprising a body affixed to the front end of the drill shell, a pair of cooperating relatively movable jaws movably mounted on said body to move in a plane perpendicular to the axis of the drill steel from a position adjacent one another and said axis to a separated position remote from said axis, pressure fluid actuated means on said body in operative engagement with said jaws for alternatively giving said jaws a power bias respectively towards said adjacent and said separated position, a first bore extending through said body coaxially with said axis, a cylindrical axially split elongated sleeve extending between said jaws in their separated position and snugly fitting in said first bore, said sleeve being axially detachably mounted in said first bore and having a guide bore formed centrally therein and coaxially with said first bore for receiving and guiding said drill steel along a portion thereof of substantial axial length, and surfaces on said jaws operable to firmly engage said sleeve with said jaws power biased towards said adjacent position for providing a circumferential support additional to said first bore for said sleeve.

2. In a rock drill as set forth in claim 1 wherein there is provided a radial slot in said body extending along said first bore and of sufficient width to provide lateral insertability of said drill steel into said bore with said sleeve detached.

3. In a rock drill as set forth in claim 2 wherein there is provided a lug on said sleeve and in engagement with said slot for preventing rotation of said sleeve in said first bore.

4. In a rock drill carrying a drill steel and mounted for movement along a feed shell, a drill steel guide comprising a body affixed to the front end of the drill shell, a pair of cooperating relatively movable jaws movably mounted on said body to move in a plane perpendicular to the axis of the drill steel from a position adjacent one another and said axis to a separated position remote from said axis, pressure fluid actuated means on said body in operative engagement with said jaws for alternatively giving said jaws a power bias respectively towards said adjacent and said separated position, an elongated guide member having a cylindrical end portion and extending between said jaws in their separated position, means for supporting said guide member on said body in coaxial relation to the axis of the drill steel and with said end portion protruding forwardly beyond said body to an extent enabling it to snugly engage a centering drill hole in the rock face to be drilled, a guide bore centrally in said member for receiving and guiding said drill steel along a portion thereof of substantial axial length during drilling of a hole forming an axial continuation of said centering hole, and surfaces on said jaws operable to firmly engage said member with said jaws power biased towards said adjacent position for providing a circumferential support for said sleeve additional to said supporting means.

5. In a rock drill as set forth in claim 4 wherein there are affixed forwardly protruding rock engaging means to the front end of the drill shell for supporting said front end on the rock face to be drilled.

6. In rock drill supporting and centering apparatus of the character described and particularly adapted for drilling long holes into a rock face where the lengths of the holes are sufficiently great to require the use of a string of a plurality of interconnected drill steel and coupling elements having different diameters, said supporting and centering apparatus having a feed shell with means disposed thereon for providing longitudinal movement of said drill steel string therealong for drilling into said rock face and a centralizer device disposed at the front of said feed shell, the combination which comprises a fixed non-openable guide bore in said centralizer coaxially aligned with said feed shell, an axially extending radial slot opening into said bore, an interchangeable axially split sleeve fitted in said bore for guiding said drill string, said sleeve having a radial lug engaging said slot for preventing rotation of said sleeve relative to said bore, said radial slot being of sufficient width for radial insertion of said drill steel and coupling element prior to insertion of said split sleeve, and said sleeve being axially elongated substantially beyond said bore in said centralizer device for providing said axial guiding of said drill string for a substantial extent therealong.

7. Apparatus as recited in claim 6 in which said sleeve has a substantially cylindrical outer surface whereby a snug fit is achieved in said bore notwithstanding different internal diameters said sleeve may have.

8. Apparatus as recited in claim 6 which also includes guide jaw means on said centralizer device for supporting and centering the rear end of said interchangeable sleeve.

References Cited

UNITED STATES PATENTS

| | | | |
|---|---|---|---|
| 79,158 | 6/1868 | Sweeney | 175—220 |
| 357,729 | 2/1887 | Murdock | 175—220 |
| 556,252 | 3/1896 | Crist | 77—5 |
| 686,257 | 11/1901 | Burgh | 173—31 |
| 853,010 | 5/1907 | Gray | 175—220 |
| 1,284,008 | 11/1918 | White | 308—71 |
| 1,285,712 | 11/1918 | Hughes | 173—32 X |
| 1,303,790 | 5/1919 | Gilman | 173—31 X |
| 1,519,981 | 12/1924 | Molt | 173—34 |
| 1,585,668 | 5/1926 | Hansen | 308—3.9 |
| 1,644,026 | 10/1927 | Mock | 308—3.9 |
| 1,666,972 | 4/1928 | Miller | 308—74 |
| 1,769,921 | 7/1930 | Hansen | 308—4 |
| 1,776,594 | 9/1930 | Mock | 308—3.9 |
| 1,891,953 | 12/1932 | Sellars | 308—4 |
| 2,079,189 | 5/1937 | Simpson | 308—4 |
| 2,144,586 | 1/1939 | Kelley | 175—209 X |
| 2,301,887 | 11/1942 | Lamb | 308—3.9 |
| 2,357,001 | 8/1944 | Hope | 308—3.9 |
| 2,386,281 | 10/1945 | Watson | 308—4 |
| 2,781,185 | 2/1957 | Robbins | 175—209 X |
| 2,825,535 | 3/1958 | Thornburg | 173—22 X |
| 3,150,723 | 9/1964 | Hale | 173—43 X |
| 3,181,630 | 5/1965 | Coburn | 175—220 |
| 3,231,318 | 1/1966 | Ytterfors | 308—3.9 |

FOREIGN PATENTS

| | | |
|---|---|---|
| 941,048 | 12/1948 | France. |
| 501,193 | 6/1930 | Germany. |
| 830,331 | 2/1952 | Germany. |
| 702,857 | 1/1954 | Great Britain. |

MARTIN P. SCHWADRON, *Primary Examiner.*

DAVID J. WILLIAMOWSKY, *Examiner.*

L. L. JOHNSON, *Assistant Examiner.*